June 8, 1943.  F. C. MOREY  2,321,038
GAS MEASURING INSTRUMENT
Filed May 29, 1942  3 Sheets-Sheet 1

FRANCIS C. MOREY
INVENTOR

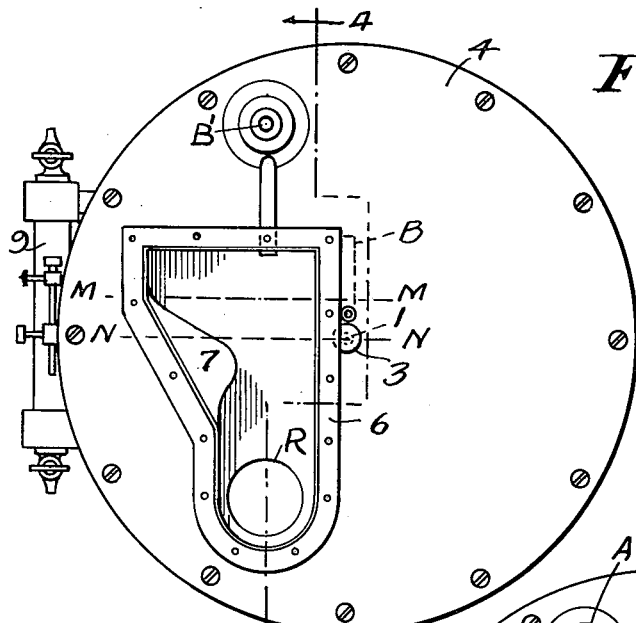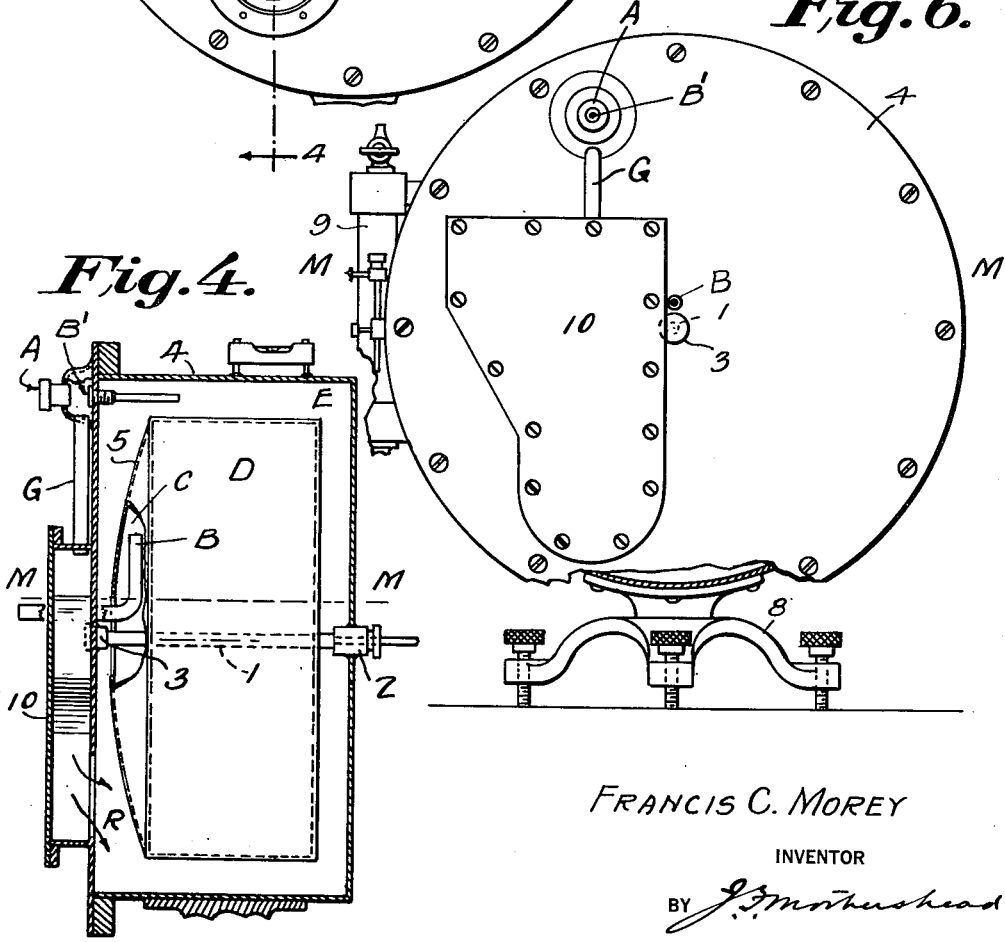

June 8, 1943.  F. C. MOREY  2,321,038
GAS MEASURING INSTRUMENT
Filed May 29, 1942  3 Sheets-Sheet 3

INVENTOR
FRANCIS C. MOREY
By J. T. Mothershead
ATTORNEY

Patented June 8, 1943

2,321,038

UNITED STATES PATENT OFFICE 2,321,038

GAS MEASURING INSTRUMENT

Francis C. Morey, Kensington, Md., assignor to Government of the United States, as represented by the Secretary of Commerce Application May 29, 1942, Serial No. 445,001

5 Claims. (Cl. 73—235)

(Granted under the act of March 3, 1883, as amended April 30, 1928; 370 O. G. 757)

The invention described herein may be manufactured by or for and used by the Government of the United States for governmental purposes without the payment to me of any royalty thereon, in accordance with the provisions of the act of April 30, 1928 (Ch. 460, 45 Stat. L. 467).

My invention relates to improvements in gas measuring instruments of the type illustrated and described in Circular of the Bureau of Standards No. 309, and particularly to that type commonly referred to as "wet gas meters," comprising an exterior casing partially filled with a liquid and a rotating drum partially submersed in the liquid.

My invention can be best understood by reference to the accompanying drawings and the description pertaining thereto wherein I point out the disadvantages in the existing types of meters and the structural changes made therein to avoid such disadvantages and improve the operational characteristics thereof.

In the drawings in which like reference characters designate like parts,

Fig. 4 is a sectional view of a modification of Figs. 2 and 3.

Fig. 5 is an elevational view of Fig. 4, with cover of the compensating chamber removed.

Fig. 6 is an elevational view of the meter of Figs. 4 and 5.

Figure 7:
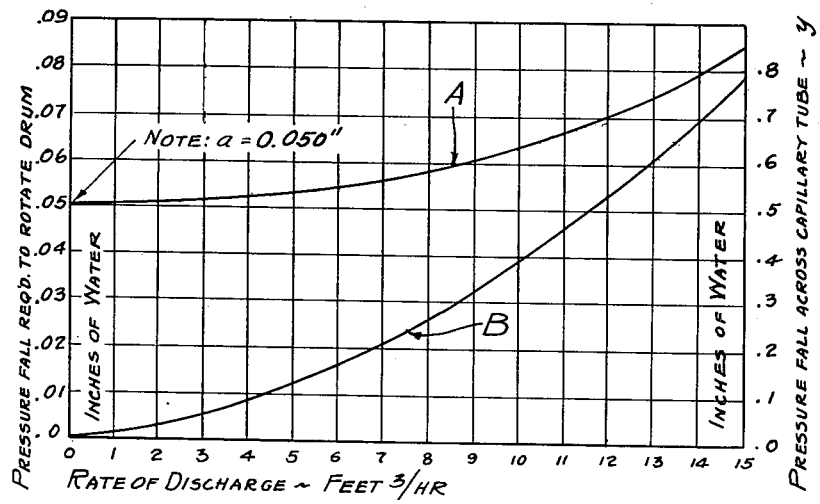
Figure 8:
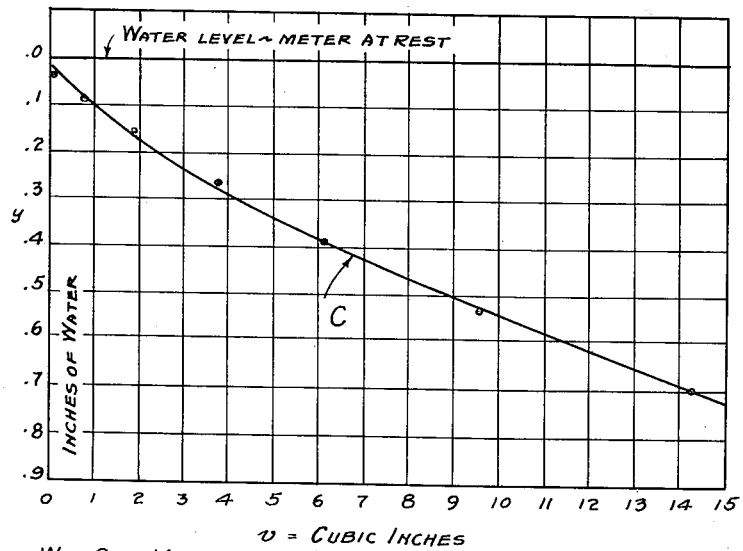

Fig. 7 contains two graphs pertaining to the formation of the compensating chamber, and Fig. 8 is a third graph likewise pertaining to the formation of the compensating chamber.

Figure 9:
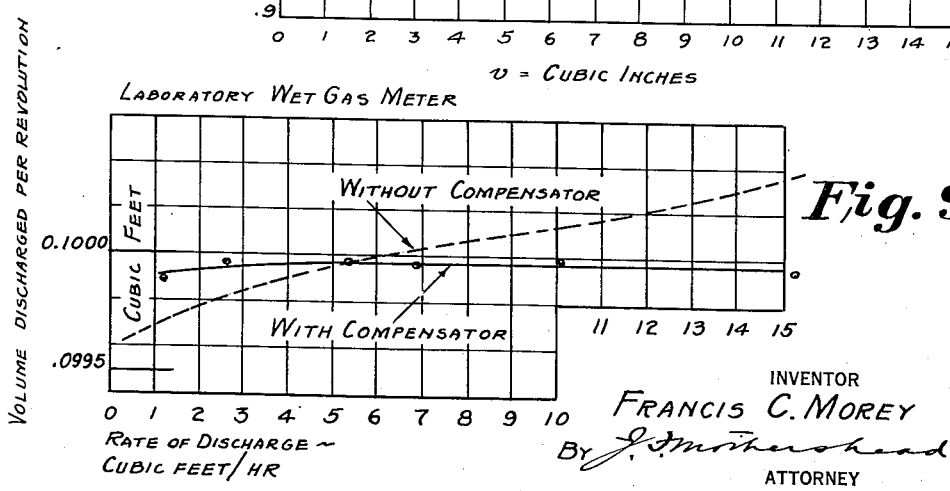

Fig. 9 gives the comparative operational characteristics of a standard meter equipped with my improvement as illustrated in Figs 4 to 6.

Figure 1:
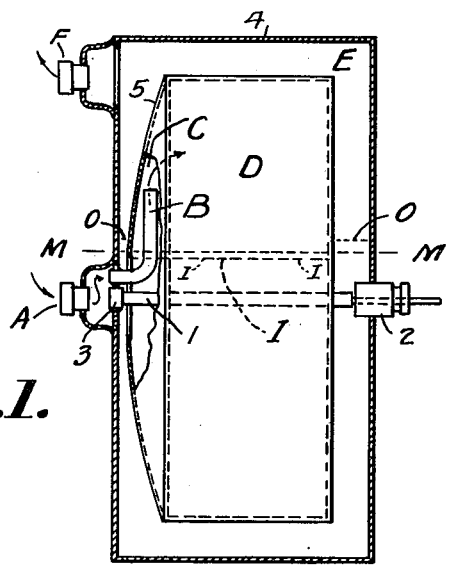
Fig. 1 is a sectional view diagrammatically illustrating a meter subject to the variations in measurements which it is the object of this invention to correct.

In meters of the type illustrated in Fig. 1 the drum D is mounted on a shaft 1 rotatably mounted in bearings 2 and 3 in the front and back wall of an outer casing 4 forming an outlet compartment E with an outlet connection F.

The drum is usually divided into four measuring compartments, of approximately helical form, by suitable partitions. Another compartment C is formed at the rear end of the drum by a hood or convex apron 5 attached to the circumference of the rear head of the drum and having a central opening larger than the shaft. The compartment C forms the inlet compartment or dry well. Each measuring compartment has an opening on both the front and rear heads of the drum. These openings are nearly radial and are placed with an angle of about 160 degrees between them. The outer casing is usually partially filled with water to a level M above the central opening of the convex partition 5. Gas is conveyed into the compartment C by an inlet port A communicating with a pipe B extending through the opening in the partition 5 and upwardly a sufficient distance above the level M of the water so that at no time will the water flow out through the port A.

The surface of the water must be sufficiently high to seal off both openings of a measuring compartment when it is at its highest point. This usually requires that about two-thirds of the measuring drum be submerged.

The cycle of operations is as follows: Start with one of the measuring compartments at its lowest position when it is full of water and both openings are under water. As the drum revolves the opening in the rear of the compartment emerges allowing the gas in the inlet chamber to enter the measuring compartment until it becomes filled with gas. Before the opening in the front of the compartment emerges from the water the one at the back is submerged, thus closing off momentarily a certain volume of gas. The opening at the front then emerges and the gas escapes into the outer casing as the drum continues to revolve and again submerges the compartment. The gas leaves the meter casing through the outlet connection. The rotation of the drum is produced by the greater pressure of the gas on the inlet side, over that of the outlet side, against the inclined partition walls of the compartments.

During each revolution each compartment delivers the amount of gas it contained at the instant it was sealed off, an amount which will evidently depend on the height of the water surface.

Since the rotary motion of the meter drum is obtained from the difference in pressure between the inlet and outlet compartments, and since the resistance to motion of the drum increases with the rate of rotation, the operating pressure drop across the drum is a function of the rate at which gas is discharged by the drum. The effect of this pressure difference is to depress the water surface which forms the floor of each compartment of the drum to an extent generally indicated by the dotted line I—I of Fig. 1, thus enlarging each compartment slightly. The depression of the water surface within the compartments of the drum causes the surface of the water in the compartment E to rise to an extent generally indicated by the level O—O of Fig. 1. Consequently the volume of gas discharged per revolution of the drum varies as a function of the rate of flow of gas through the meter, the errors in measurement being greater at the higher rates of flow. With small meters of the laboratory type this variation of the calibration may amount to more than one percent when the rate varies within the useful range of the meter.

An object of my invention is to automatically maintain the volume of gas within each compartment constant regardless of the rate of flow through the meter.

The invention to be described herein consists of an auxiliary chamber attached or connected to the meter case or built within it, the purpose of which is to control automatically the water level within the meter, thus maintaining a uniform calibration independent of the rate of discharge. The device consists of two elements, a restricting orifice or capillary placed in the inlet gas connection, and a shaped water compartment connected to the meter case. Although there are several ways in which these parts may be attached to the meter, that illustrated in Fig. 2 has been selected as the simplest to explain. Here the inlet connection A has been removed from the casing 4, the tube B has been replaced by a capillary U shaped tube B' and extra casing 6 forming a compensating chamber has been attached on the back of the meter covering the former inlet connection, the inlet connection A' being provided near the top of the casing 6. This compensating chamber communicates with the interior of the casing 4 through a port R, and has the general shape indicated in Fig. 3.

In operation the gas enters through the connection A' at a pressure $P_1$. It flows through the U-shaped capillary tube B' into the compartment C. Due to the fluid resistance offered by this tube the pressure in the apron is reduced to a lower value $P_2$. As before it passes through the drum D to the compartment E and outlet F. The dash lines M—M denote the water level when the meter is not running. On starting the flow, the higher pressure $P_1$ causes the water in the compensating chamber to be depressed to a new level N—N, the excess water flowing into the meter case as indicated by the arrows R. This raises the levels shown in Figure 1 at I—I and O—O to I'—I' and O'—O' in Figure 2. It should be noted particularly that I'—I' now coincides with M—M; that is, with the compensator the inlet water level remains unchanged when gas flows.

Figures 2, 3:
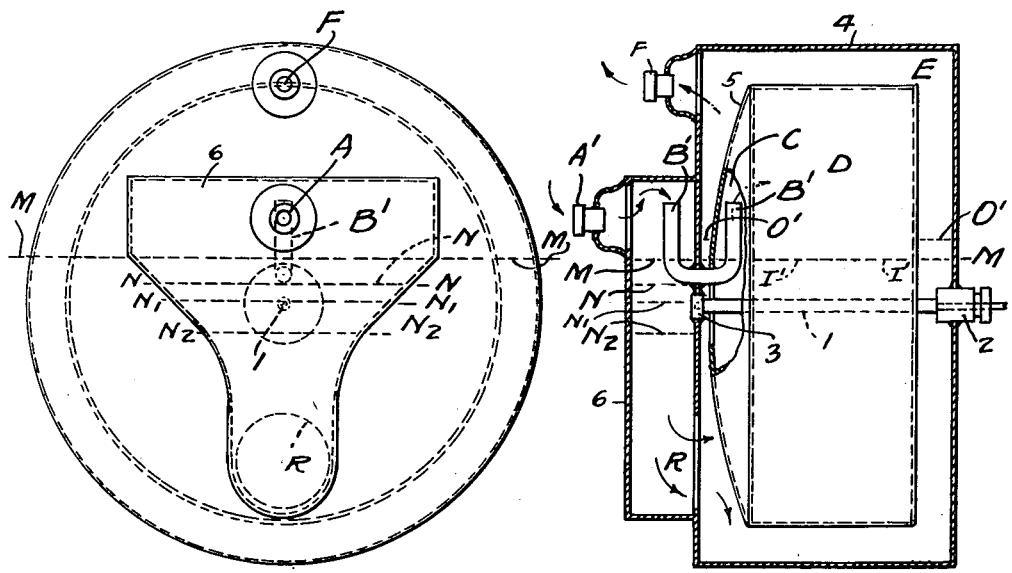
Fig. 2 is a sectional view diagrammatically illustrating the meter of Fig. 1 with one embodiment of my invention added thereto.
Fig. 3 is an elevational view of the meter of Fig. 2.

The pressure difference $P_1$ minus $P_2$ is a function of the rate of flow of the gas through the tube B'. The resistance of the drum to motion is likewise a function of the rate of flow (i. e., of the rate of rotation of the drum). In order to adjust these two relationships and enable the first to provide the correct amount of water added to the meter to overcome the effects produced by the second, the compensating chamber must be properly shaped, either in its original formation as illustrated in Figs. 2 and 3, or by building out a portion of the wall as indicated at 7 in Fig. 5.

In order to determine the correct shape for the compensating chamber, three types of measurements must be made. These are:

1. Determination of the area of the water surface within the meter.
2. Measurement of the pressure difference required to rotate the drum at various rates.
3. Measurement of the fall of pressure across the capillary selected, as a function of the rate of flow.

The first of these measurements is made, after levelling the meter by adjustment of the tripod base 8, by adding measured volumes of water to the meter and observing the change in height of the water surface in the gage glass 9. The water may be added by means of a volumetric pipette, and the level change measured by means of a cathetometer or a micrometer pointer gage. Experience has shown that for small changes of level such as occur in the operation of the meter, the relationship between the volume added or removed and the change in water level is practically linear; that is, the water surface area remains constant, and may be found by dividing the volume increment by the height increment.

Determination of the second item is accomplished by inserting a piezometer tube into the inlet compartment of the drum through the hole in the apron. This tube is made similar to the usual inlet tube, but may be of smaller diameter, and should be shorter so that the pressure indications will not be affected by the discharge of the inlet tube. A differential pressure manometer capable of measuring small pressure differences is connected between this piezometer tube and the case of the meter. The pressure drop through the drum may then be determined as a function of the rate of flow, using the meter itself to determine the volume of gas passed, and timing the discharge by means of a stop watch. A typical graph is shown in curve A of Fig. 7.

For the third measurement, the capillary is connected in series with the meter, with a suitable manometer connected across the capillary to determine the pressure difference. Sufficient observations are made to establish the relationship between the rate of flow and the pressure difference. In both this measurement and the preceding one, it is convenient to express the pressure difference in inches of water. Curve B of Fig. 7 is a typical graph of the pressure drop across the capillary tube.

Calculations are carried out in the following manner:

Let $A$ = surface area of the sealing water (square inches).

$Z$ = pressure drop (inches in water) required to rotate the drum at a given rate of discharge of the meter.

$a$ = limiting value of $Z$ as the rate approaches zero.

$y$ = pressure fall (inches in water) across the capillary at the given rate.

To overcome the effect of the pressure difference required to revolve the drum of the meter at the given rate a volume of water, $v$, must be added to the case. This water will raise the water surface not only inside the metering compartments, but throughout the entire case as well; that is, over the entire surface area A. To produce a flat operating characteristic, however, it is not necessary to overcome the initial pressure drop, $a$, required to start the drum turning, but only the change of pressure drop as the rate increases. Hence the volume of water (in cubic inches) to be added to the case is given by the equation $v=A(v-a)$. The relationship between $v$ an $y$ may be expressed graphically. Each is a function of the rate, and this parameter may be eliminated so as to leave $v$ as a function of $y$. A sample calculation is given here in detail for a rate of 10 cubic feet per hour, and the results for other rates are tabulated in the accompanying table. Fig. 8 is a graph of the values of $v$ and $y$, plotting $y$ downward since this pressure difference causes the water in the compensating chamber to be depressed.

$A=$ 48.8 square inches
$a=$ 0.0500 inch (from curve A of Fig. 7)
$Z=$ 0.0625 inch (from curve A of Fig. 7)

hence $v=48.8$ $(0.0625-0.0500)=0.610$ cubic inch
$y=0.382$ (from curve B of Fig. 7)

| Rate of discharge cubic ft./hr. | Z | Z−a | v | y |
|---|---|---|---|---|
| 2 | 0.0501 | 0.0001 | 0.005 | 0.030 |
| 4 | .0516 | .0016 | .078 | .082 |
| 6 | .0540 | .0040 | .195 | .160 |
| 8 | .0576 | .0076 | .371 | .260 |
| 10 | .0625 | .0125 | .610 | .382 |
| 12 | .0695 | .0195 | .952 | .530 |
| 14 | .0791 | .0291 | 1.420 | .697 |

Any shape of compensating reservoir may be selected which will give this relationship between $v$ and $y$. The simplest is a flat chamber of rectangular horizontal section. If this form is selected the shape of the curved surface would be similar to that indicated in Fig. 8.

It will be noted that theoretically the shape of the compensating chamber depends on the nature of the gas being metered (i. e., a different shape is needed for each kind of gas used). This is because the pressure fall across the capillary varies with the gas density whereas the pressure drop across the meter drum does not. Practically this difference is of no consequence since the correction to be introduced by the compensator is only a few percent, and hence variations of the pressure fall across the capillary due to density changes produce only second order effects.

With the chamber shaped as in Fig. 3 the water level when no gas is flowing through the meter is denoted M—M as before. Since the pressure drop through the capillary tube B′ increases more rapidly with increasing flows than does the resistance of the meter drum, the compensating chamber is made wider at the top and successively narrower at lower levels N—N, $N_1$—$N_1$, and $N_2$—$_2$ established at higher rates of flow.

When my invention is applied to a standard meter as illustrated in Figs. 4, 5 and 6 it may be desired to adopt a slightly different practice. In the first place it may be desirable to reverse the direction of flow of the gas, thus reversing the customary direction of rotation of the drum. There are two advantages of this direction of flow. In the first place this places the gage glass 9 and reference datum at drum inlet pressure, so that it is possible to observe the water level existing in the metering compartments. Secondly, there are more possibilities of gas leakage in the case, gage glass, thermometer connections and joints of the case than there are in the tube which connects the apron of the drum with the outside; hence if the flow is reversed such leaks will occur before the gas is metered.

The term "auxiliary reservoir" used herein and in the claims is equally applicable whether the same be interior or exterior of the meter case, as the function would be the same in either instance. The upper part of the auxiliary reservoir communicates with the meter inlet connection A by means of the tube or pipe G (Figures 4, 5 and 6) which is soldered or otherwise suitably fastened into the inlet fixture. A large water passage is provided at R between the auxiliary reservoir and the meter case.

Operation of the meter may be explained by referring to Figs. 4 and 5. Gas enters the meter at A and passes through the removable capillary restriction B′. The higher pressure $P_1$ is communicated by means of the pipe connection G to the compensating chamber 6 having cover plate 10. The water within the reservoir of the compensating chamber 6 passes to and from the meter case 4 through the opening R in the back plate. The shaping of the chamber was accomplished by means of the plastic 7 (paraffin), shown in Fig. 5, the particular slope of the upper surface between the lines M—M and N—N (the extreme levels encountered in practice) being determined in the manner hereinbefore described.

When the correct shape has once been determined for a patricular design of meter, it should be satisfactory for all meters produced according to the same design, provided that the dimensions of the drum, tightness of bearings and shaft stuffing box and the size of the restricting orifice are maintained within a prescribed tolerance. The auxiliary reservoir may then be constructed to the determined shape without the use of the plastic described, and the device thus adapted to production.

The improvement in the operating characteristics of the meter is illustrated in the curve, Fig. 9, which shows the performance of the meter with and without the compensating chamber.

Having thus described my invention what I claim is:

1. In combination with a gas meter having a rotary compartmented drum partially immersed in a liquid reservoir whereby the liquid forms the floor of each compartment as the same is filled with gas flowing through said meter, means for maintaining the liquid at a constant level within said compartment receiving the gas to be measured, said means consisting of a shaped auxiliary reservoir of liquid communicating with the liquid reservoir of said meter, a restricted orifice in the inlet connection to said meter and means for applying the pressure of said gas upstream of said orifice to the surface of said liquid in the auxiliary reservoir whereby the liquid in said auxiliary reservoir is forced into the reservoir of said meter in an amount sufficient to create a hydrostatic pressure on the liquid within the measuring compartment of said drum and maintain the surface of the liquid within said compartment at a constant level.

2. In combination with a gas meter having a rotary compartmented drum partially immersed in a liquid reservoir whereby the liquid forms the floor of each compartment as the same is filled with gas flowing through said meter, means for maintaining the liquid at a constant level within said compartments, said means consisting of a compensating compartment in the form of a shaped auxiliary reservoir of liquid attached to and communicating with the liquid reservoir of said meter, a restricted orifice in the inlet connection to said meter and means for applying the pressure of said gas upstream of said orifice to the surface of said liquid in the auxilary reservoir whereby the liquid in said auxiliary reservoir is forced into the reservoir of said meter in an amount sufficient to create a hydrostatic pressure on the liquid within the measuring compartments of said drum and maintain the surface of the liquid within said compartments at a constant level.

3. In combination with a gas meter having a rotary compartmented drum partially immersed in a liquid reservoir whereby the liquid forms the floor of each compartment as the same is filled with gas flowing through said meter, means for maintaining the liquid at a constant level within said compartments, said means consisting of a shaped auxiliary reservoir of liquid communicating with the liquid reservoir of said meter, a restricted orifice in the inlet connection to said meter and means for applying the pressure of said gas before it passes through said restricted orifice to the surface of said liquid in the auxiliary reservoir whereby the liquid in said auxiliary reservoir is forced into the reservoir of said meter in an amount sufficient to create a hydrostatic pressure on the liquid within the measuring compartments of said drum and maintain the surface of the liquid within said compartments at a constant level.

4. In combination with a gas meter having a rotary compartmented drum partially immersed in a liquid reservoir whereby the liquid forms the floor of each compartment as the same is filled with gas flowing through said meter, means for maintaining the liquid at a constant level within said compartments, said means consisting of a shaped auxiliary reservoir of liquid communicating with the liquid reservoir of said meter, a restricted orifice in the inlet connection to said meter and means for applying the pressure of said gas before it passes through said restricted orifice as hydrostatic pressure on the liquid within the measuring compartments of said drum to maintain the surface of the liquid within said compartment at a constant level.

5. In combination with a gas meter having a rotary compartmented drum partially immersed in a liquid reservoir whereby the liquid forms the floor of each compartment as the same is filled with gas flowing through said meter, means for maintaining the liquid at a constant level within said compartments, said means consisting of an auxiliary reservoir of liquid communicating with the liquid reservoir of said meter, a restricted orifice in the inlet connection to said meter for producing a differential in pressure between the gas before and after it enters the meter and means for applying the differential in pressure as a hydrostatic pressure on the liquid within the measuring compartments of said drum and said communicating auxiliary reservoir, to maintain the surface of the liquid within said measuring compartments at a constant level.

FRANCIS C. MOREY.